United States Patent
Hu et al.

(10) Patent No.: US 7,827,129 B2
(45) Date of Patent: Nov. 2, 2010

(54) CRYSTAL LOOKUP TABLE GENERATION USING NEURAL NETWORK-BASED ALGORITHM

(75) Inventors: Dongming Hu, Knoxville, TN (US); Blake Atkins, Maryville, TN (US); Mark W. Lenox, Harriman, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 641 days.

(21) Appl. No.: 11/750,554

(22) Filed: May 18, 2007

(65) Prior Publication Data

US 2007/0271206 A1 Nov. 22, 2007

Related U.S. Application Data

(60) Provisional application No. 60/801,528, filed on May 18, 2006.

(51) Int. Cl.
*G06N 3/08* (2006.01)

(52) U.S. Cl. .............................. 706/25; 706/15; 706/16; 706/26; 382/128; 382/131; 382/155; 382/156; 382/157; 382/158; 382/159

(58) Field of Classification Search ............. 706/14–18, 706/20–22, 26–28; 250/363.01, 363.02, 250/363.03, 363.04; 382/128, 130, 131, 382/155–159
See application file for complete search history.

(56) References Cited

U.S. PATENT DOCUMENTS

| | | | | |
|---|---|---|---|---|
| 3,798,370 A * | 3/1974 | Hurst | ..................... | 178/18.05 |
| 5,519,224 A * | 5/1996 | Mattern | ..................... | 250/369 |
| 6,307,203 B1 * | 10/2001 | Stearns et al. | .......... | 250/363.03 |
| 6,337,481 B1 * | 1/2002 | Stearns et al. | .......... | 250/363.03 |
| 7,301,144 B2 * | 11/2007 | Williams et al. | ......... | 250/252.1 |
| 7,515,304 B2 * | 4/2009 | Ito et al. | ..................... | 358/3.23 |
| 2003/0055799 A1 * | 3/2003 | Starzyk | ...................... | 706/27 |
| 2005/0151084 A1 * | 7/2005 | Zibulevsky et al. | .... | 250/363.03 |
| 2006/0138315 A1 * | 6/2006 | Williams et al. | ......... | 250/252.1 |
| 2006/0209066 A1 * | 9/2006 | Kubara et al. | ................ | 345/424 |

OTHER PUBLICATIONS

Jeong et al. "Performance Improvement of Small Gamma Camera USing NaI(TI) Plate and Position Sensitive Photo-Multiplier Tubes", 2004, pp. 4961-4970.*
Honkela, "Description of Kohonen's Self-Organizing Map", 1998, pp. 1-8.*
"Neural Network Toolbox for Use with MatLab", 2004, pp. 8-1 to 8-30.*

* cited by examiner

*Primary Examiner*—Donald Sparks
*Assistant Examiner*—Omar F Fernandez Rivas
(74) *Attorney, Agent, or Firm*—Peter Kendall

(57) ABSTRACT

A crystal lookup table used to define a matching relationship between a signal position of a detected event in a PET scanner and a corresponding detector pixel location is generated using a neural network-based algorithm, and is implemented by a FPGA.

10 Claims, 3 Drawing Sheets

CRYSTAL LOOKUP TABLE GENERATION USING NEURAL NETWORK-BASED ALGORITHM

CLAIM OF PRIORITY FROM RELATED APPLICATION

This application claims priority under 35 U.S.C. §119(e) from Provisional Application Ser. No. 60/801,528, filed May 18, 2006.

FIELD OF THE INVENTION

The present invention generally relates to nuclear medicine, and systems for obtaining nuclear medicine images. In particular, the present invention relates to the construction of a crystal lookup table used in connection with PET scanning.

BACKGROUND

Known PET scanners use an array of segmented detectors (e.g., LSO detectors) in a tomographic arrangement to allow imaging. For example, the INVEON™ dedicated PET scanner from Siemens uses an array of sixty-four 20×20 segmented detectors. The matching and calibration of the system electronics to the detector arrays involves three stages. The first stage identifies the individual crystal elements (pixels) from the raw X and Y ADC (analog to digital) values. The second stage calibrates the energy of the events detected from an individual crystal to the 511 KeV photo peak. The third stage corrects the time stamp of the event to ensure that any inherent timing skew has been removed.

The currently known implementation of crystal identification is an expert system type design that looks at the position profile and determines the crystal locations in a manner that is roughly similar to the approach that an unskilled human would undertake. First, raw position profile data (X, Y) is histogrammed into a 512×512 image (e.g., the digitized X, Y value in a block of the array). An initial estimate of the edges of the calibration array image is performed by summing rows and columns of the position profile and locating their edges. All future activity is limited to this area. Next, a grid representing a scaled version of an average block is laid over the position profile. Row optimization is then performed by comparing the estimated pixel positions with the peak locations within individually banded rows and columns. Finally, a hill-climbing algorithm is used to fine-tune the exact location of every crystal by allowing the peaks to move in a limited distance in a direction with a positive gradient. Crystal lookup tables (CLTs) are generated as the result of the crystal identification process. Although this method achieves around 95% accuracy, it involves intense human interactions for crystal lookup table corrections.

SUMMARY

An embodiment of the present invention eliminates the extent of human intervention necessary for crystal lookup table generation as per the prior art. According to an aspect of the invention, a neural network-based algorithm is used to build the CLT. In particular, a modified unsupervised self-organizing feature map is trained by incoming scintillation events to construct a CLT.

BRIEF DESCRIPTION OF THE DRAWINGS

At least one embodiment of the invention will now be more fully described by way of example with reference to the accompanying drawings in which.

DETAILED DESCRIPTION OF EXEMPLARY EMBODIMENTS OF THE INVENTION

Embodiments of the present invention will now be described and disclosed in greater detail. It is to be understood, however, that the disclosed embodiments are merely exemplary of the invention and that the invention may be embodied in various and alternative forms. Therefore, specific structural and functional details disclosed herein are not to be interpreted as limiting the scope of the claims, but are merely provided as an example to teach one having ordinary skill in the art to make and use the invention.

Figure 1:
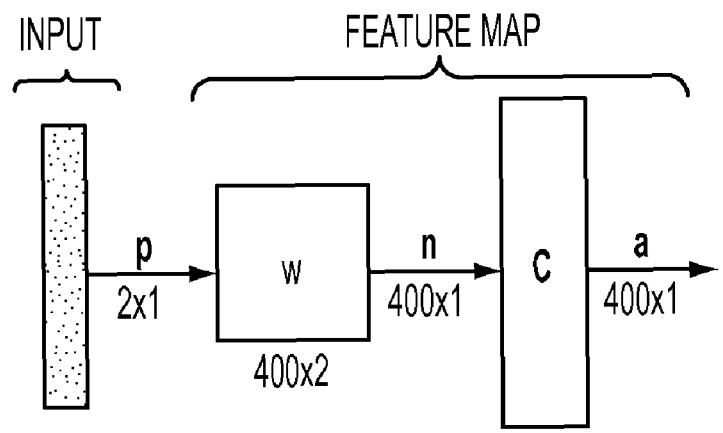
FIG. 1 is a diagrammatic illustration of the structure of a self-organizing feature map in accordance with an embodiment of the invention.

A block position profile from which a crystal lookup table (CLT) is built includes millions of events, randomly detected by all pixels in a detector block. Therefore, use of a supervised neural network approach is not practical; however, a self-organizing (unsupervised) neural network scheme can solve the problem effectively. In particular, as illustrated in FIG. 1, Kohonen's self-organizing feature map (SOFM), which is a competitive neural network that contains a weight vector matrix (neurons) and a competitive layer, is used.

In particular, the SOFM first determines the "winning" neuron a from n using the competitive layer equation $$a = \text{compet}(Wp),$$

where p is a 2×1 input vector from the detector position profile and W is a weight matrix representing neuron positions. For an exemplary detector, e.g. a 20×20 block detector as used in the Siemens INVEON™ Dedicated PET scanner, there are 400 neurons representing the locations of each of the "pixels" of the detector block; accordingly, W is a 400×2 matrix (400 pixels, with X and Y positions of each). Vector a is the output from the competitive layer indicating the winning neuron. In the normalized case, Wp can be regarded as the distance between p and neurons weight vectors W. Vector a is the output from the competitive layer indicating the winning neuron. Only the neuron with the closest weight vector to p "wins" the competition each time.

Next, the weight vectors for all neurons within a certain neighborhood (e.g. a neighborhood of 1) for the winning neuron are updated using the Kohonen rule, $$w(q) = (1-\alpha)w(q-1) + \alpha\, p(q)$$

where α is a learning rate, q is the training index number, and w is the neuron in the neighborhood of the winning neuron (which has the same dimension of p).

When a vector p is presented, the weight of the winning neuron will move toward p. As a result, after many presentations of p from the position profile, the neuron will have learned the vectors that cluster together, which indicates a pixel location in the position profile. After training, the positions of the neurons in the weight matrix will represent the positions of the detector pixels. Thereafter, the crystal lookup table can be constructed easily from the pixel locations represented by the neurons.

Figure 2:
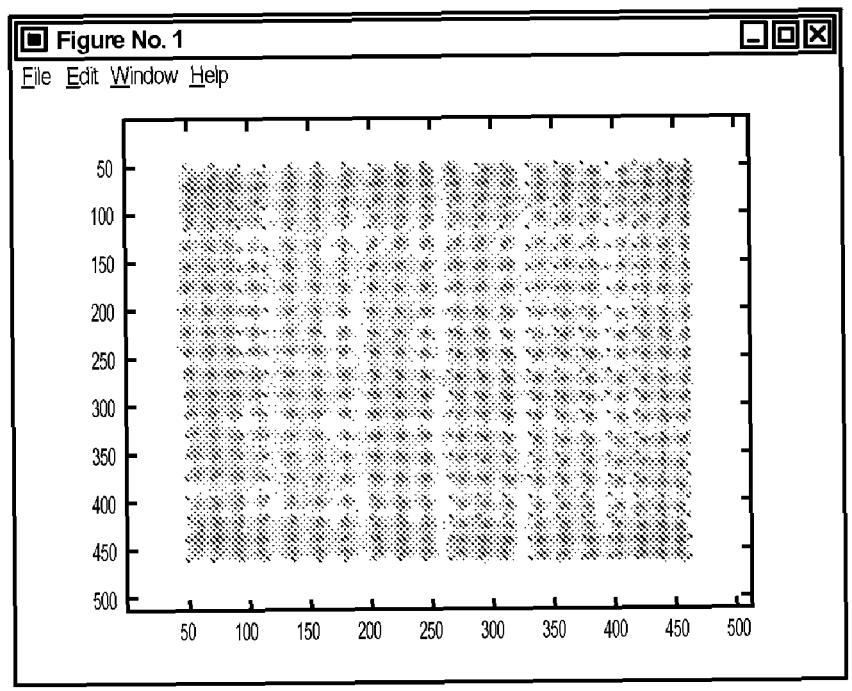
FIG. 2 is a position profile and initial position of neutrons.

By way of example of implementation of an exemplary method of the invention, the SOFM training may be simulated by a MathLab program. The 400 (exemplary) neurons are evenly (randomly) distributed in the area of interest as initial weight vectors. FIG. 2 illustrates a detector position profile and the neurons' initial positions (round dots). The position profile is then histogrammed from a list mode file that records the sequence of all events, randomly detected by all pixels of the detector with a wide open energy window. Reading the (X, Y) position of an event sequentially from the list mode file as an input vector ensures that a training vector is randomly picked up from the position profile. In an exemplary simulation, three million events are used as training vectors; thus, the weight matrix is updated three million times. In preferred embodiments, the training algorithm may be modified and the learning rate varied over time to achieve better training solutions.

Figure 3:
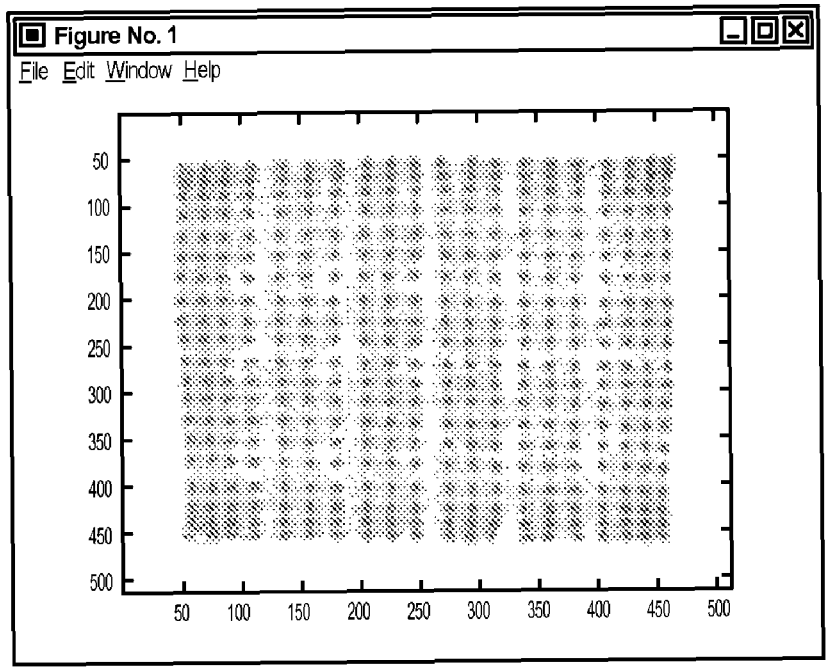
FIG. 3 is a neutron position profile after network training.

The exemplary trained network is illustrated in FIG. 3. In this exemplary simulation, most of the neurons have "found" the right pixel location. Only two neurons are misplaced among 400 neurons, which yields 99.5% location accuracy. Total training simulation time for three million events is approximately eight hours on a 1.66 GHz Pentium IV processor-based PC.

Thus, the developed neural network-based algorithm for CLT building produces higher pixel identification accuracy. There are two issues to be addressed in making this algorithm practical on a PET scanner. First, like all competitive networks, dead neuron and stability problems may occur, as apparent in the upper light-hand portion of FIG. 3. This issue can be solved by introducing strong constraints from the grid pixel pattern of the detector structure.

Figure 4:
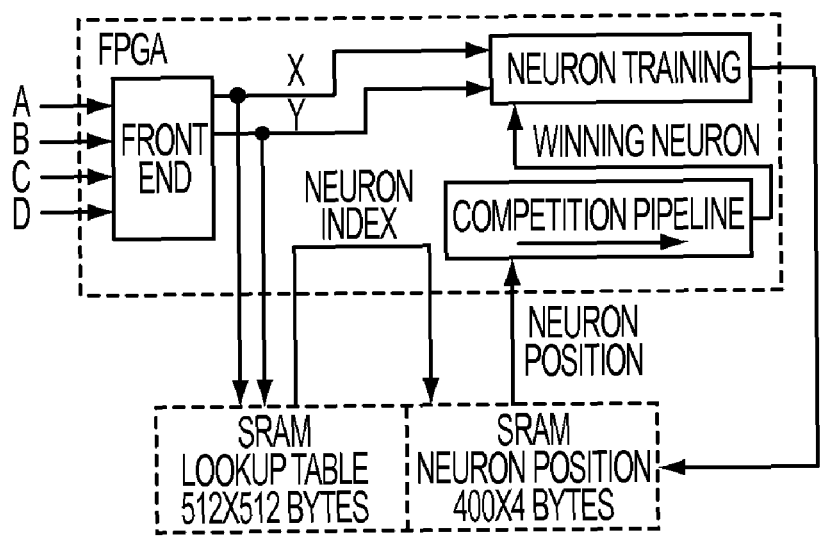
FIG. 4 is a schematic illustration of the system of an embodiment of the invention implemented on a field programmable gate array (FPGA) device.

Second, the relatively lengthy time to train the system can be overcome by implementing the SOFM algorithm on a field programmable gate array (FPGA) chip within the event processing module (EPM) electronics to accelerate the training process. That makes it possible to build the CLT on-line while the position profile is being acquired and makes the CLT building time comparable to that of the prior art, but with significantly higher accuracy. A schematic illustration of such a system is shown in FIG. 4.

The EPM electronics related to the SOFM training includes a large-scale FPGA chip and several Static Random Access Memory (SRAM) chips. The FPGA implementation includes a front end module, a SRAM addressing module, a competition pipeline, and a neuron-training module. The total logic utilizes less than 20% of the FPGA resource.

Figure 5:
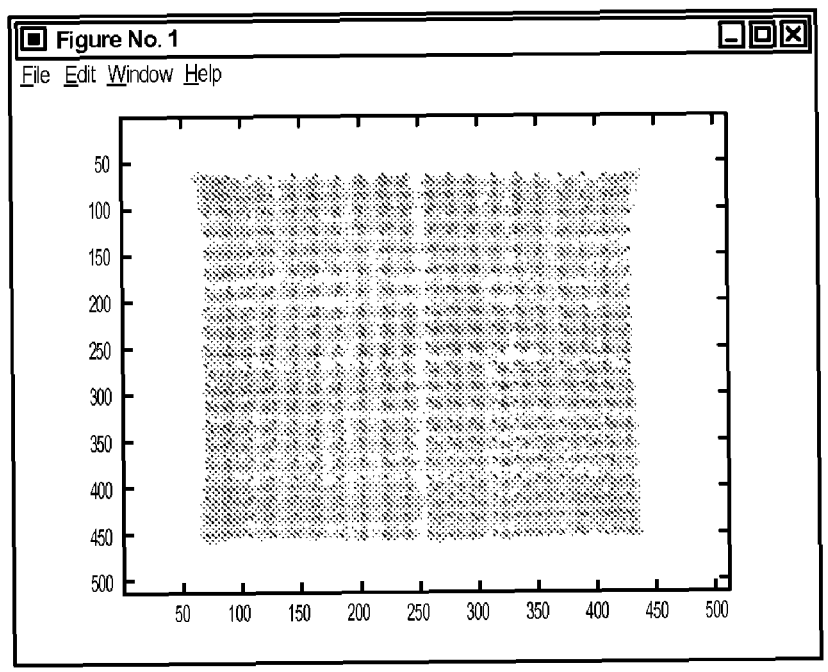
FIG. 5 illustrates the position profile and initial position of neurons in SRAM in the system illustrated in FIG. 4.

A position profile is acquired first with a short period of time. Initial weight vectors of the exemplary 400 neurons based on the position profile are calculated and downloaded to the SRAM before training. The initial neurons are evenly (randomly) distributed in the interested area of the position profile as shown in FIG. 5 and as discussed above. Since multiplication is involved in competition and learning calculations, and integers do not provide enough resolution, a fixed point data format with 9 integer bits and 7 fractional bits is used. Therefore, the X, Y position of each neuron occupies 4 bytes, with a range of 0-512 and resolution of $2^{-7}$.

A lookup table is also generated based on the initial weight vectors of the neurons and stored in the SRAM. The lookup table defines regions indexed by the X, Y value of the event. Only the neurons in the same region (rather than all 400 neurons) compete with each other. The adjacent regions overlap each other to ensure that all necessary neurons are picked up for competition when an event comes in. The lookup table reduces the size of the competitive layer and the pipeline processing time, so the required FPGA resource and processing cycle does not increase with the number of neurons.

When an event triggers, the digitized ABCD values are sampled in the front end and the X, Y position of the event is calculated. The X, Y value is used as an address to retrieve the region number from the lookup table in the SRAM. The positions of all the neurons in the region are read from the SRAM and sent to the competition pipeline sequentially. The FPGA contains multiple 18 bit×18 bit multiplier blocks. Due to the pipeline implementation, only one multiplier is needed. The winner of the competition is the neuron to be updated by the X, Y value of the incoming event using the Kohonen rule. Each time an event happens, only one neuron is updated. The updated neuron is then stored back to the SRAM, and the training logic is ready for the next event. The neurons' positions are uploaded from the SRAM after the training is completed. A CLT is built based on the peak positions represented by the neurons' positions.

Figure 6:
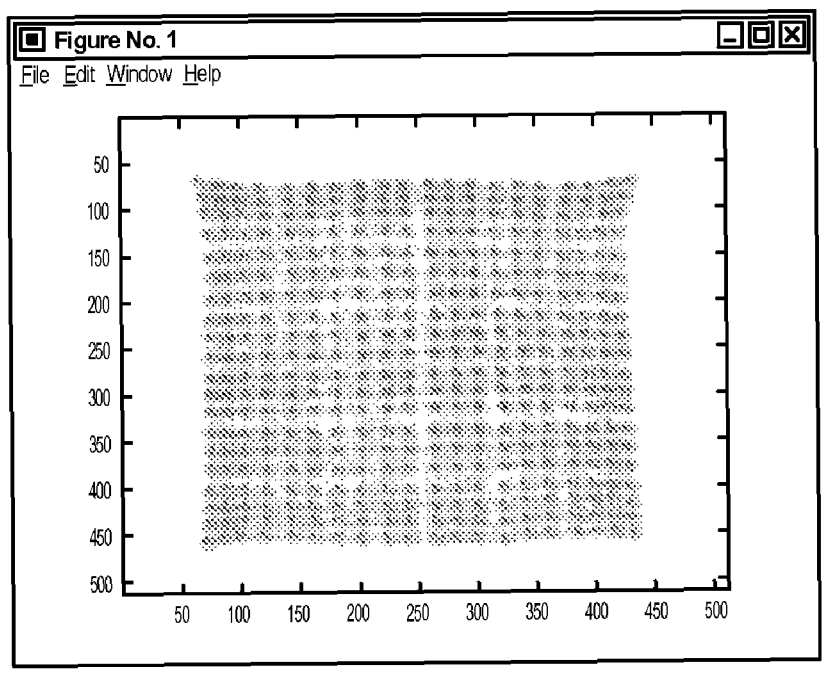
FIG. 6 illustrates the results of training implemented on the FPGA device of FIG. 4.

FIG. 6 illustrates the results of SOFM training performed by FPGA implementation. During training, a 511 keV weak source is placed in front of the detector, and in 3 minutes the SOFM is trained by more than 4.5 million events. The FPGA training logic is running at a clock with a period of 16 ns, and a training cycle only consumes 688 ns. Therefore, if a hot source is used, the training can be accomplished in seconds. In this training, all neurons find their corresponding pixel location; however, some neurons are not located at the center of their corresponding pixel.

As has been observed in simulation, dead neuron and stability problem may occur. In particular, as shown in the Figures, one neuron is oscillating between two pixels while another neuron never wins the competition and is never trained by any incoming events. In FPGA training, some neurons are pulled toward the edge of the pixels due to the noise events in the gap. This implicates the signal-noise ratio that can be tolerated by the algorithm; applying a weighted learning rate based on histogramming can help alleviate such issues. Additionally, using a larger neighborhood size at the beginning of the training may also overcome the dead neuron issue.

Once the neuron is trained to the correct position, it is "trapped" around this location in future training unless the pixel is changed or the tube gains are unbalanced. This feature makes the FPGA implementation a useful method for detector on-line monitoring. (The logic can be run in parallel with the acquisition logic.) When a detector defect happens due to a pixel cracking or tube drifting, it can be detected immediately rather than after image reconstruction.

The foregoing discussion is illustrative of the invention and is not meant to be limiting. Various modifications to the disclosed methods and systems will occur to those having skill in the art. Therefore, the scope of the invention is defined by the following claims.

What is claimed is:

1. A method for generating a crystal lookup table for use in a nuclear imaging scanner, comprising:

generating a block position profile for a multiplicity of events, the block position profile consisting of X and Y position data of said events;

sequentially reading the X and Y position data of the events in at least one of a histogrammed block position profile for software simulation and on the fly with FPGA hardware implementation;

inputting the X and Y data for each of said events into a self-organizing feature map as an input vector;

defining a weight matrix which represents at least one of neuron positions, and detector pixel locations;

updating the weight matrix for all neurons within a predetermined neighborhood to generate pixel locations; and following system training, constructing a crystal lookup table using the generated pixel locations.

2. The method of claim 1, wherein neuron a=compet(Wp), W is a weight matrix representing neuron positions, and p is the input vector.

3. The method of claim 1, wherein the step of updating is performed according to the rule $W(q)=(1-\alpha)w(q-1)+\alpha p(q)$, where $\alpha$ is a predetermined learning rate and q is a training index number.

4. The method of claim 1, wherein the method is implemented by hardware.

5. The method of claim 4, wherein the method is implemented by a field programmable gate array (FPGA).

6. A self-organizing neural network for generating a crystal lookup table for use in a nuclear imaging scanner, comprising:

a memory for storing data; and a processor for processing, an input for receiving a block position profile for a multiplicity of events, the block position profile consisting of X and Y position data of said events and converting said profile into input vectors;

a self-organizing feature map for receiving the X and Y data for each of said events as an input vector;

defining a weight matrix which represents at least one of neuron positions, and detector pixel locations; and a competitive layer for determining a winning neuron a from said self-organizing feature map, and updating the weight matrix for all neurons within a predetermined neighborhood to generate pixel locations, wherein the crystal lookup table is generated based on a trained weight vector.

7. The self-organizing neural network of claim 6, wherein neuron a=compet (Wp), W is a weight matrix representing neuron positions, and p is the input vector.

8. The self-organizing neural network of claim 6, wherein the step of updating is performed according to the rule $W(q)=(1-\alpha)w(q-1)+\alpha p(q)$, where $\alpha$ is a predetermined learning rate and q is a training index number.

9. The self-organizing neural network of claim 6, wherein the network is implemented on hardware.

10. The self-organizing neural network of claim 9, wherein the hardware comprises a field programmable gate array (FPGA) device.

* * * * *